(12) United States Patent
Ohta et al.

(10) Patent No.: US 6,625,784 B1
(45) Date of Patent: Sep. 23, 2003

(54) SEMICONDUCTOR INTEGRATED CIRCUIT DEVICE, METHOD OF TESTING THE SAME, DATABASE FOR DESIGN OF THE SAME AND METHOD OF DESIGNING THE SAME

(75) Inventors: Mitsuyasu Ohta, Osaka (JP); Sadami Takeoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 92 days.

(21) Appl. No.: 09/637,867

(22) Filed: Aug. 15, 2000

(30) Foreign Application Priority Data

Aug. 23, 1999 (JP) .............................. 11-234906

(51) Int. Cl.[7] .............................................. G06F 17/50
(52) U.S. Cl. .............................. 716/4; 714/30; 714/726; 714/729
(58) Field of Search .............................. 716/4, 1, 2, 18; 714/726, 733, 734, 735, 736, 729; 703/14

(56) References Cited

U.S. PATENT DOCUMENTS

| | | | | |
|---|---|---|---|---|
| 5,617,428 A | * | 4/1997 | Andoh ......................... | 714/726 |
| 5,640,114 A | * | 6/1997 | El-Ziq et al. ................ | 327/202 |
| 5,848,074 A | * | 12/1998 | Maeno ......................... | 714/720 |
| 6,081,916 A | * | 6/2000 | Whetsel, Jr. ................ | 714/727 |
| 6,115,827 A | * | 9/2000 | Nadeau-Dostie et al. ... | 713/503 |
| 6,178,534 B1 | * | 1/2001 | Day et al. .................... | 714/745 |
| 6,199,183 B1 | * | 3/2001 | Nadaoka ...................... | 714/726 |
| 6,260,164 B1 | * | 7/2001 | Aipperspach et al. ....... | 714/726 |
| 6,272,656 B1 | * | 8/2001 | Yoshiyama .................. | 714/733 |
| 6,389,566 B1 | * | 5/2002 | Wagner et al. ............... | 714/726 |

FOREIGN PATENT DOCUMENTS

JP    2002-82145    * 3/2002    ........... G01R/31/28

OTHER PUBLICATIONS

"Scalable Architecture for Testing Embedded Cores", S. Adham et al., Preliminary Outline of the IEEE P1500, 8 pages.

* cited by examiner

*Primary Examiner*—John F. Niebling
*Assistant Examiner*—Stacy Whitmore
(74) *Attorney, Agent, or Firm*—McDermott, Will & Emery

(57) ABSTRACT

Elements of a combinational circuit are divided into plural groups. The output from a terminal Q is fixed at shifted timing in flip-flop circuits belonging to each of groups X, Y and Z resulting from this grouping. With the outputs from the terminals Q of the flip-flop circuits thus fixed, an operation of a shift mode is carried out. When the operation of the shift mode is completed, a hold releasing operation and a capture operation are carried out with respect to each of the groups of the flip-flop circuits. For example, the hold releasing operation is carried out when one clock is at a high level with the capture operation carried out when the clock is at a low level, or the hold releasing operation is successively carried out with respect to each of the groups and then the capture operation for capturing a data signal is carried out with respect to each of the groups.

14 Claims, 15 Drawing Sheets

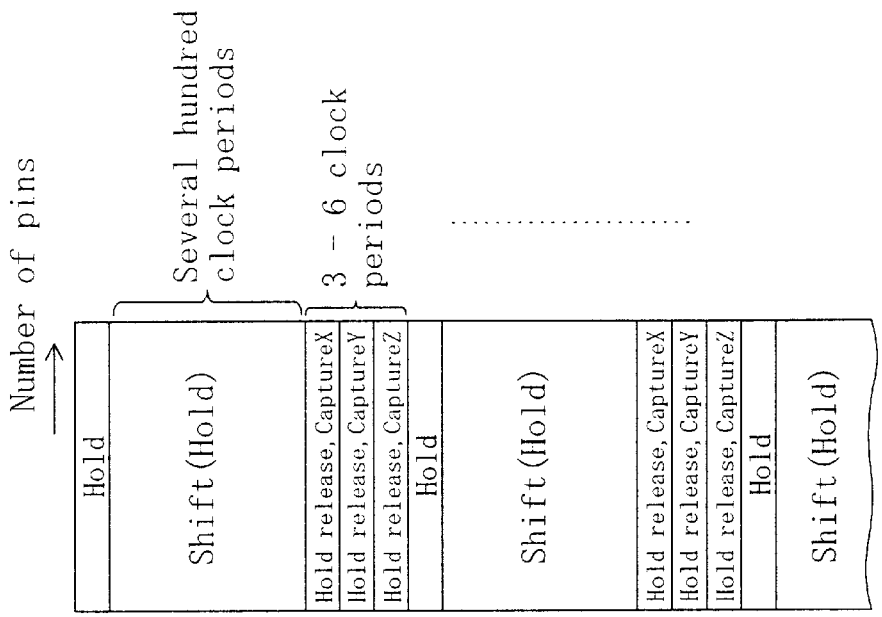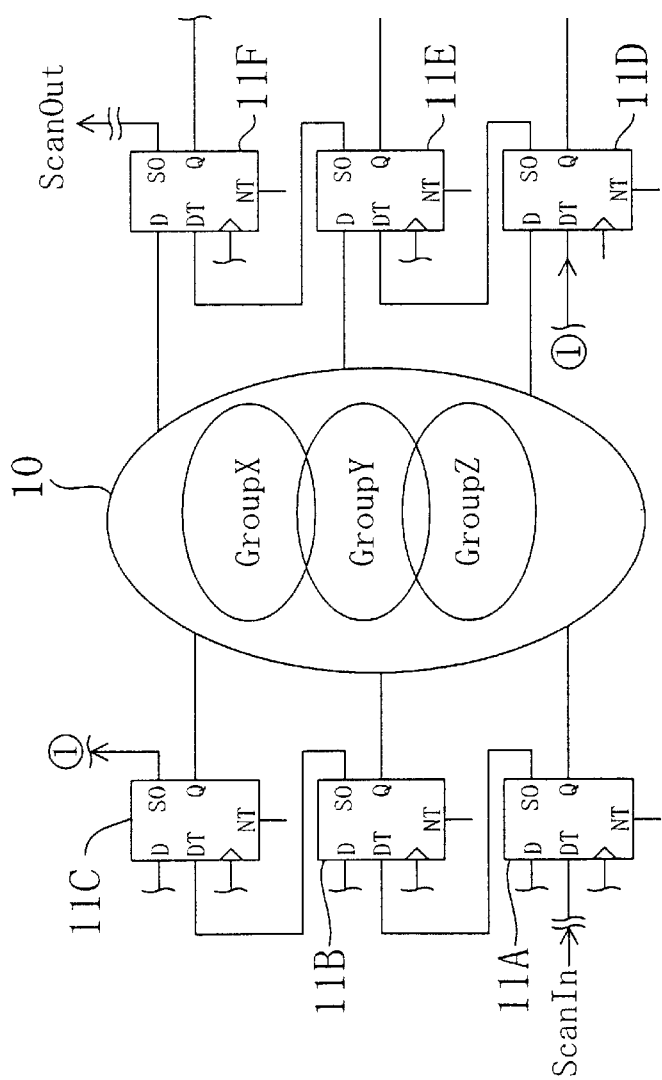

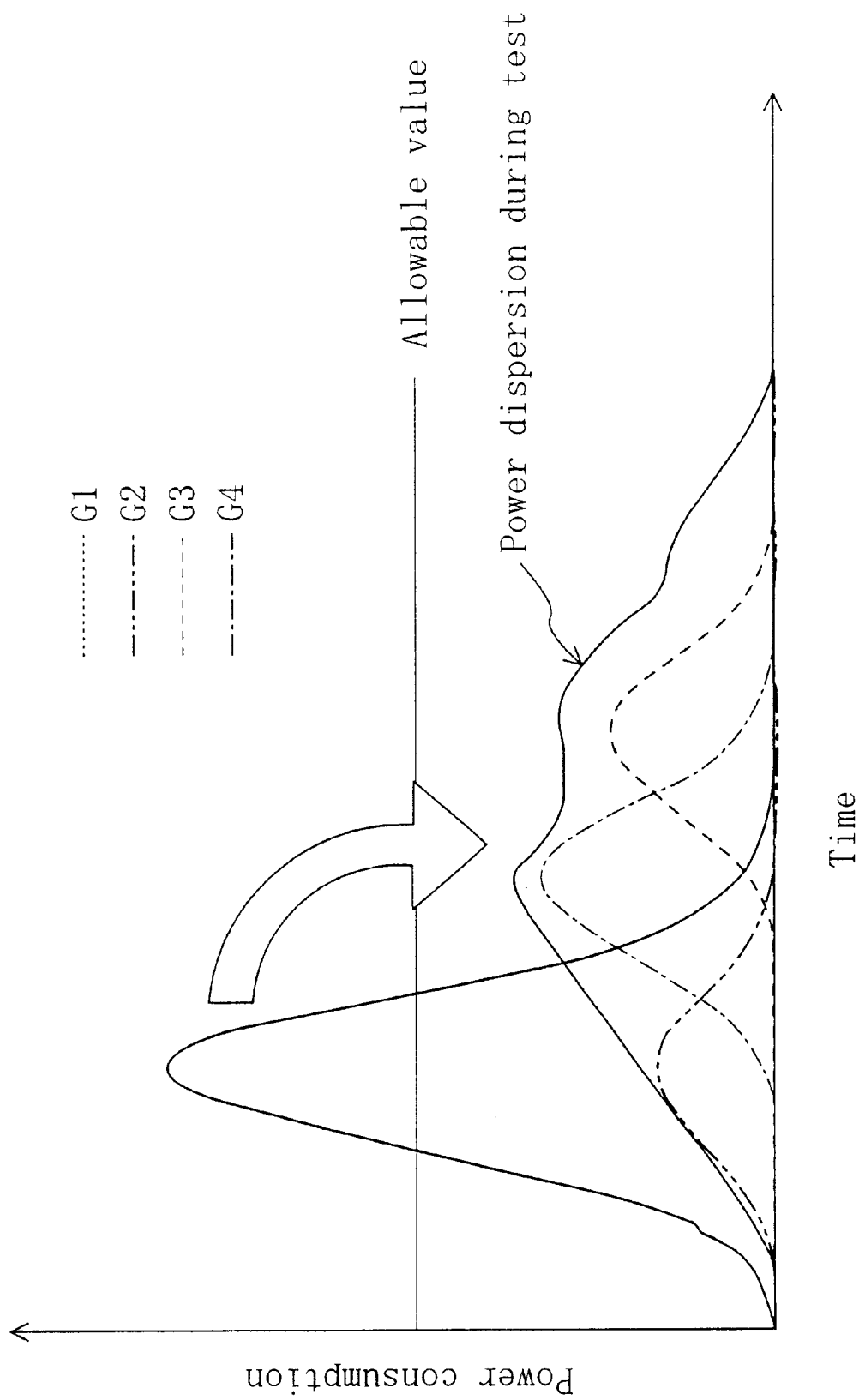

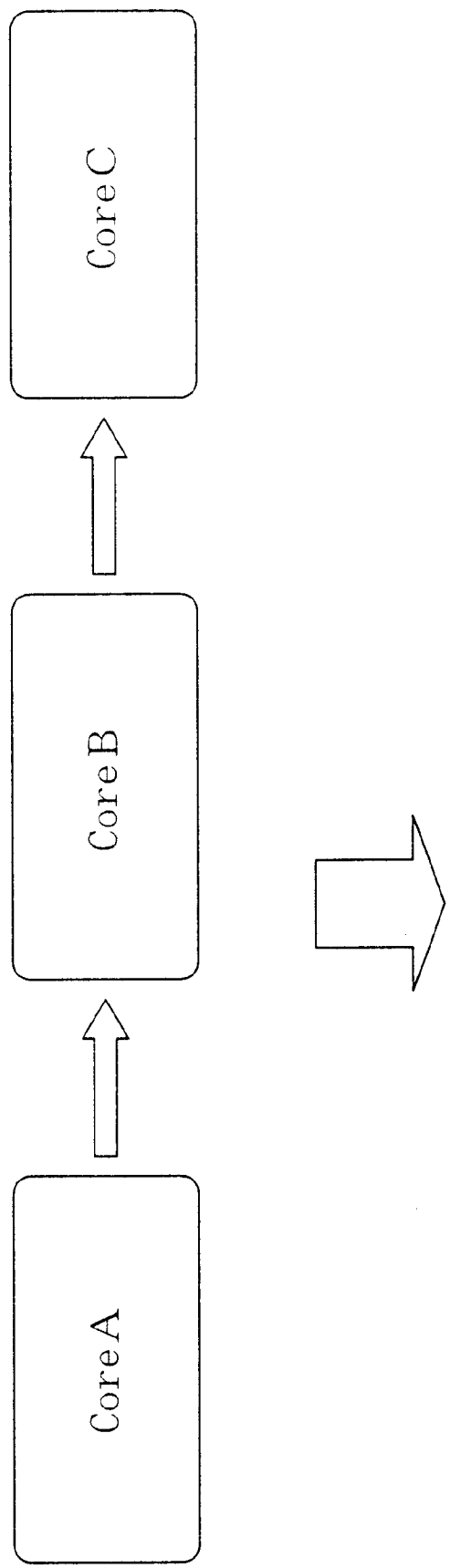

SEMICONDUCTOR INTEGRATED CIRCUIT DEVICE, METHOD OF TESTING THE SAME, DATABASE FOR DESIGN OF THE SAME AND METHOD OF DESIGNING THE SAME

BACKGROUND OF THE INVENTION

The present invention relates to an integrated circuit device including a scan test circuit, a method of testing the integrated circuit device, a database for use in design of the integrated circuit device and a method of designing the integrated circuit device.

An integrated circuit device, such as a system LSI, including a large number of circuits as well as a scan test circuit for testing these circuits is conventionally known.

FIG. 13 is a perspective view for illustrating a state of designing an integrated circuit device in which data of circuits to be designed are taken out from a data base. Data of the respective circuits are registered in the database as a core 1, a core 2, a core 3 and a core 4, which are taken out from the database to be appropriately arranged in the integrated circuit device. As the data of these cores, data previously used may be reused or new data may be created.

Although not shown in FIG. 13, some integrated circuit devices include a scan test circuit for testing each logic circuit included therein. In a scan test method, flip-flops included in the integrated circuit device are used to test, for example, whether or not each element (a logic circuit, in particular) of the integrated circuit device is normally operated. These flip-flops are connected to one another, so as to form a scan test circuit working as a shift register in a test mode. An input/output pin of the integrated circuit device is used as a shift input/output terminal, so that the internal flip-flops can be accessed from the outside. In this method, an internal logic circuit can be dealt with as a combinational circuit, and thus, a self-diagnostic function can be realized. In this case, a combinational circuit means a circuit including merely an element not conducting a storage operation, such as an AND, an OR and a gate.

FIG. 14(a) is a diagram for showing part of a conventional system LSI including a scan test circuit. As is shown in FIG. 14(a), between a combinational circuit 110 and another combinational circuit 110, that is, internal circuits of the system LSI, flip-flops 111A through 111F used for the scan test are disposed so as to be connected to each combinational circuit 110. Although merely one combinational circuit 110 is shown in FIG. 14(a), the system LSI actually includes a large number of combinational circuits, between which flip-flops for forming a scan test circuit are disposed.

Each flip-flop 111 has a terminal D for bringing in a data signal, a terminal DT for bringing in a scan test signal, a clock terminal for bringing in a clock signal, a terminal NT for bringing in a signal NT for setting an operation mode, and a terminal Q for outputting the scan test signal and the data signal. (Although not shown in the drawing, a general flip-flop additionally has a terminal/Q.)

The terminal Q of one flip-flop (for example, 111A) is connected to the terminal DT of an adjacent flip-flop (for example, 111B), so that a scan test circuit can be formed by serially connecting all the flip-flops 111A through 111F together. A scan-in signal input from an input pin, serving as a scan test signal input terminal, of the system LSI is received at the terminal DT of a flip-flop disposed at the top of one scan test circuit within the system LSI, and a scan-out signal is output from the terminal Q of a flip-flop at the last stage of the scan test circuit to the outside through an output pin of the system LSI. In general, on e system LSI includes several through dozens of scan test circuits.

In testing the system LSI, the input pin of the system LSI serving as the scan test signal input terminal and the output pin thereof serving as the scan test output terminal are connected to a tester, so as to receive the scan test signal DT output from the tester at the scan test signal input terminal and to send the data signal D having passed through the combinational circuit of the system LSI (namely, a data value obtained from the scan test signal having passed through the combinational circuit) to the tester. The tester compares the value of the data signal D with an expected value, thereby determining whether or not each element of the combinational circuit 110 is defective.

In this test of the system LSI using the tester, the signal NT is switched to enter the test mode. In particular, the test mode for the scan test is classified into a shift mode and a capture mode.

FIG. 14(b) is a diagram for showing change with time of control during the scan test. While the signal NT is in the shift mode, the scan test signal DT is supplied to the flip-flops 111A through 111F. In other words, the scan test signal is successively sent from the terminal Q of one flip-flop to the terminal DT of another flip-flop at the next stage every clock, so that all the flip-flops constituting the scan test circuit can hold the scan test signal to be input to the combinational circuit. This takes time corresponding to the number of clocks (which is several hundred clocks or more in general) equal to the number of flip-flops included in the scan test circuit (namely, time corresponding to several hundred clock periods or more). With the scan test signal DT held by the flip-flops 111A through 111F, the signal NT is switched to enter the capture mode, so that each of the flip-flops 111A through 111F can fetch the data signal. In this case, the flip-flops 111A through 111F simultaneously fetch the data signal, and hence, the capture operation takes time corresponding to one clock. The data signal D is a signal having passed through the combinational circuit 110, and has an output value corresponding to the value of the scan test signal DT having been input to the combinational circuit 110. Then, in a subsequent test mode, a next scan test signal DT is sent to the flip-flops 111A through 111F, and at the same time, the data signals D held by the flip-flops 111A through 111F are sent from the output pin to the tester. When the shift operation is completed, each of the flip-flops 111A through 111F included in the scan test circuit holds the scan test signal DT instead of the data signal D fetched in the capture mode. Thereafter, the capture mode and the shift mode are alternately repeated.

In this manner, by comparing an expected value, which is expected to be obtained by allowing the scan test signal DT input to the combinational circuit 110 to pass through the combinational circuit, with the data signal D actually output from the combinational circuit 110, it can be determined whether or not the combinational circuit 110 is defective.

In conducting the scan test, it is necessary to simultaneously operate as many combinational circuits as possible so as to complete the scan test of the integrated circuit device in a short period of time. This is because, when the tester is used for a long period of time, the cost of the integrated circuit device ultimately becomes high due to high running cost of the tester.

Therefore, in general, in sending a scan test signal to the flip-flops, test patterns in accordance with the number of flip-flops are respectively shifted by the number of clocks equal to the number of the flip-flops, and then the capture operation is started after one clock.

When a large number of cores are operated in a short period of time as in the aforementioned scan test of the integrated circuit device, however, the momentary power consumption (peak power consumption) during the test can be very large. Particularly, since a large number of and a variety of circuits are recently packed in one chip of an integrated circuit device such as a system LSI, the peak power consumption is estimated to be extremely large.

FIG. 15 is a diagram for exemplifying change with time of power consumption in the entire integrated circuit device during the scan test. As is shown in FIG. 15, the power consumption during the test is momentarily increased by operating the cores 1 through 4 simultaneously (namely, in one clock period). Although power supply is generally designed wit h respect to power consumption during general use of a device, the power supply design does not take the increase of peak power consumption during the test into consideration. In general use, there is substantially no chance that all the circuits included in an integrated circuit device are simultaneously operated, and hence, the peak power consumption during general use is not very large. As a result, an integrated circuit device designed without considering the peak power consumption during the test cannot be normally operated in the scan test or can be damaged by the test.

SUMMARY OF THE INVENTION

An object of the invention is reducing the peak power consumption in a scan test by providing means for dispersing operation timing of respective circuits of an integrated circuit device in the scan test while suppressing increase of time of using a tester.

The first integrated circuit device of this invention comprises plural logic circuits and plural flip-flop circuits disposed between the plural logic circuits, and each of the flip-flop circuits includes a first input port for receiving a scan test signal; a second input port connected to corresponding one of the logic circuits for receiving, as a data signal, an output of the logic circuit according to a scan test signal input to the logic circuit; a third input port for receiving a control signal for switching input to the flip-flop circuit between the scan test signal and the data signal; a fourth input port for receiving a hold signal; a first output port connected to the logic circuit for transferring the scan test signal to the logic circuit; and a second output port for outputting the data signal and the scan test signal, a scan test circuit is formed by serially connecting the plural flip-flop circuits by successively connecting the second output port of an arbitrary flip-flop circuit among the plural flip-flop circuits to the first input port of another of the flip-flop circuits disposed at a next stage, and an output value output from the first output port is fixed in receiving the hold signal at the fourth input port.

Accordingly, in the shift operation of the scan test, the internal state of the logic circuit is prevented from changing in accordance with every clock of the shift operation. As a result, the peak power consumption during the scan test of the integrated circuit device can be reduced.

In the first integrated circuit device, the output value output from the first output port of each of the flip-flop circuits can be fixed to a value held in receiving the hold signal.

In this case, the fourth input port of each of the flip-flop circuits may also work as the third input port.

Alternatively, in the first integrated circuit device, the output value output from the first output port of each of the flip-flop circuits can be fixed to 1 or 0 regardless of a value held in receiving the hold signal.

The second integrated circuit device of this invention comprises first and second circuits; a first test circuit for testing the first circuit; a second test circuit for testing the second circuit; a clock supply part for supplying a clock signal to the first circuit and the second circuit; a clock inverting part for inverting the clock signal supplied from the clock supply part and outputting an inverted clock signal; and an output switching circuit disposed between the clock inverting part and the second circuit for receiving the clock signal and the inverted clock signal and outputting the inverted clock signal to the second circuit in testing the second circuit.

Accordingly, even when the test is performed simultaneously in plural circuits, the operation timing is shifted by a half clock period, and hence, increase of the peak power consumption due to the simultaneous test of the plural circuits can be avoided.

In the second integrated circuit device, the first circuit can be a logic circuit, and the second circuit can be a memory.

The first method of this invention of testing an integrated circuit device, including plural logic circuits and plural flip-flop circuits disposed between the logic circuits, the flip-flop circuits being successively connected to form a scan test circuit, conducts a scan test by repeating the steps of (a) conducting a holding operation for fixing an output signal from each of the flip-flop circuits to a path connected to corresponding one of the logic circuits; (b) conducting a shift operation for successively sending a scan test signal to the flip-flop circuits and for successively sending a data signal from each of the flip-flop circuits to outside of the integrated circuit device; (c) conducting a hold releasing operation for releasing the output signal fixed in the step (a) after completing the shift operation; and (d) conducting a capture operation for capturing an output signal of the logic circuit by each of the flip-flop circuits after the step (c).

According to this method, it is possible to suppress increase of the peak power consumption derived from change of the internal state of the logic circuit in accordance with the scan test signal during the shift operation. Furthermore, the peak power consumption during a holding operation, a hold releasing operation and a capture operation can be reduced by additionally conducting the following procedures:

With elements of each of the logic circuits divided into plural groups, the output signal can be fixed to a value held by the flip-flop circuit in fixing the output signal in the step (a), the step (c) can be conducted with respect to each of the groups, and after completing a first shift operation, the step (a) can be carried out after the step (c) and before the step (d).

With elements of each of the logic circuits divided into plural groups, the output signal can be fixed to a value held by the flip-flop circuit in fixing the output signal in the step (a), the step (c) and the step (d) can be carried out with respect to each of the groups in a manner that a capture operation of one group is carried out after a hold releasing operation of the group, and after completing a first shift operation, the step (a) can be carried out after the step (d).

With elements of each of the logic circuits divided into plural groups, the output signal can be fixed to 1 or 0 regardless of a value held by the flip-flop circuit in fixing the output signal with respect to each of the groups in the step (a), the step (c) and the step (d) can be carried out with respect to each of the groups in a manner that a capture operation of one group is carried out after a hold releasing operation of the group, and after a second shift operation, the step (a) can be carried out after the step (d).

In the first method of testing an integrated circuit device, elements of each of the logic circuits are divided into groups preferably in a manner that peak power consumption during the scan test does not exceed an allowable value of power consumption of the integrated circuit device in general use.

In the second method of this invention of testing an integrated circuit device including first and second circuits, a first test circuit for testing the first circuit, a second test circuit for testing the second circuit and a clock supply part for supplying a clock signal to the first and second circuits, the first circuit is tested in accordance with the clock signal, and the second circuit is tested, while the first circuit is being tested, in accordance with an inverted clock signal obtained by inverting the clock signal.

According to this method, even when plural circuits are simultaneously tested, the increase of the peak power consumption can be suppressed.

In the case where, in the second method of testing an integrated circuit device, the first circuit is a logic circuit and the second circuit is a memory, remarkable effects can be exhibited.

In the method of this invention of designing an integrated circuit device using a database including at least one core storing data necessary for designing the integrated circuit device, estimated information regarding power consumption during a test of the core is described in the database, the estimated information regarding power consumption during a test of the core is used in selecting the core in higher level design, and design information obtained as a result of the higher level design is used in lower level design.

According to this method, repeat of re-design loop can be reduced and a circuit can be more rapidly designed as compared with the case where power consumption is first estimated in the lower level design.

In the method of designing an integrated circuit device, design using the estimated information is preferably architecture design.

Furthermore, the design information preferably includes information for instructing, by using information of data flow among plural cores designed in the architecture design, to divide the cores into plural groups and to design a circuit structure capable of conducting a capture operation successively in the order from a group on a lower level side of the data flow.

In the method of designing an integrated circuit device, the design information preferably includes information on grouping for dividing the core into plural groups.

In the method of designing an integrated circuit device, the design information preferably includes information on a test method.

In the method of designing an integrated circuit device, when the database includes plural cores requiring different test methods, the design information preferably includes test scheduling determined, with each of the test methods represented by a plane test pattern obtained by using time and a pin number as a coordinate, so as to minimize test time in consideration of restriction in a number of usable pins and not to allow peak power consumption to exceed an allowable value of power consumption of the integrated circuit device in general use.

The database of this invention for use in design of an integrated circuit device comprises plural cores each storing data necessary for designing the integrated circuit device, and the database includes information regarding power consumption of the cores during a test.

Accordingly, an integrated circuit device can be designed in consideration of not only power consumption during general use but also power consumption during a test.

The information regarding power consumption during a test includes an estimated value of peak power consumption of each of the cores; an estimated maximum transition number of states of each of the cores, a circuit scale of each of the cores and power consumption of gates included in each of the cores; and a circuit and a simulation pattern.

In the database for use in design of an integrated circuit device, the database preferably includes information regarding a possible division number of each of the cores. The information regarding a possible division number of each of the cores includes a level at which power consumption during a shift operation is equal to peak power consumption in dividing the core; a division number and power consumption of a core not accompanied by change in a test or design; and a division number and peak power consumption in every clock of a core not accompanied by change in a test or design.

Furthermore, the database preferably includes information regarding division probability of each of the cores. The information regarding division probability of each of the cores includes a maximum possible division number of the core and a number of clock systems.

BRIEF DESCRIPTION OF THE DRAWINGS

FIGS. 5(a) and 5(b) are respectively a circuit diagram for showing part of a system LSI used in a second example of the scan test method of Embodiment 2 and a diagram for showing change of a test mode;

FIG. 7 is a diagram for showing effects of the examples of the scan test method of Embodiment 2;

FIG. 8 is a data flowchart for showing flow of data between cores A, B and C at a functional level;

DETAILED DESCRIPTION OF THE INVENTION

EMBODIMENT 1

Figure 1:
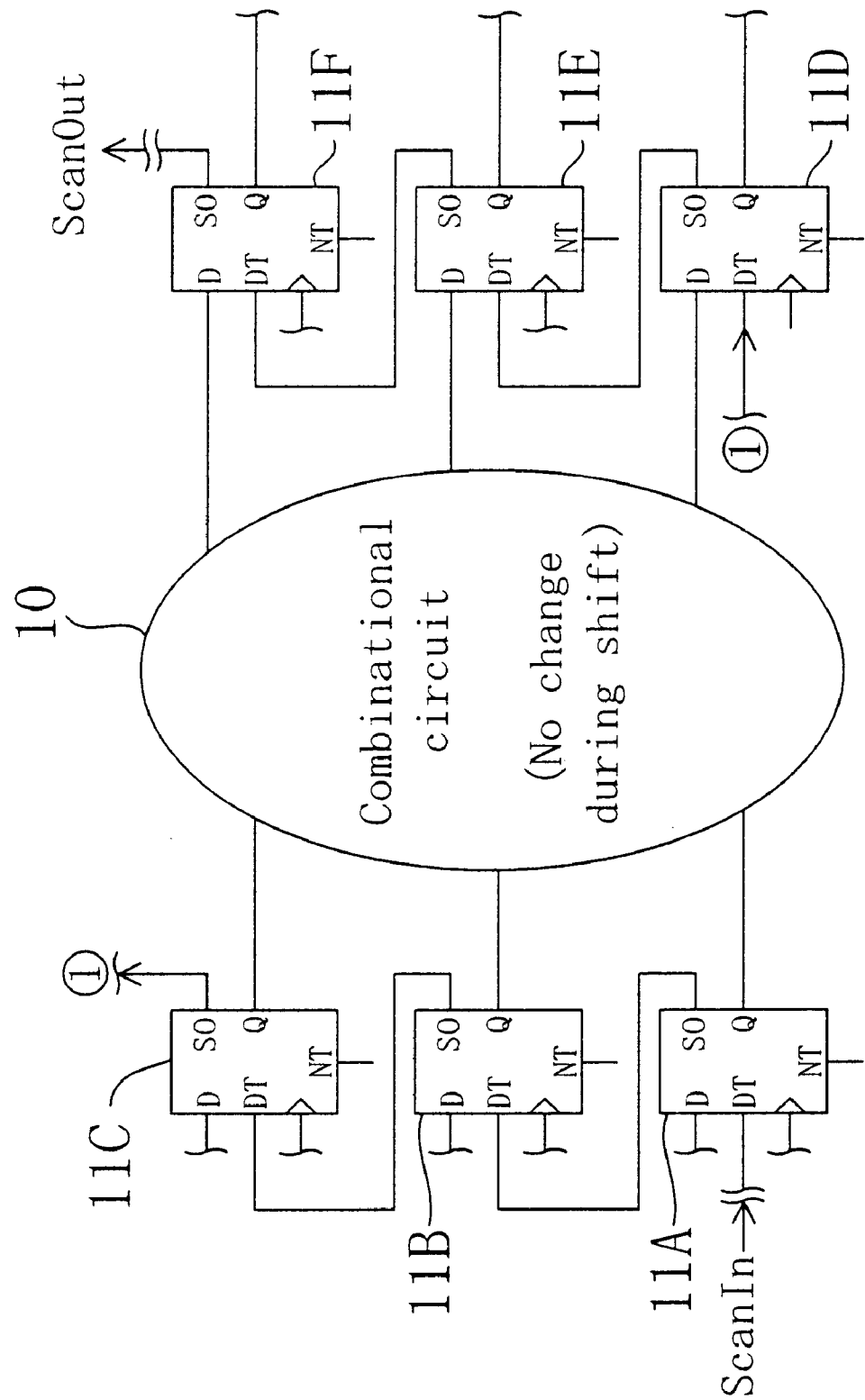
FIG. 1 is a block circuit diagram for showing part of a system LSI, that is, an integrated circuit device according to Embodiment 1 of the invention.

FIG. 1 is a diagram for showing part of a system LSI, that is, an integrated circuit device according to Embodiment 1. As is shown in FIG. 1, the system LSI includes a combinational circuit 10, that is, one logic circuit within the system LSI, and flip-flop circuits 11A through 11F disposed between and connected to the combinational circuits 10. Although merely one combinational circuit 10 is shown in FIG. 1, flip-flop circuits within the system LSI are actually used as scan test circuits for testing combinational circuits including a large number of elements of the system LSI. As the flip-flop circuits 11A through 11F, flip-flops provided for general use are used as much as possible.

The system LSI also includes a circuit not applicable to the scan test, and such a circuit is tested by another test method.

Each flip-flop circuit 11 has a terminal D for bringing in a data signal D, a terminal DT for bringing in a scan test signal DT, a clock terminal for bringing in a clock signal, a terminal NT for bringing in a signal NT for setting an operation mode, a terminal Q for outputting the data signal D, and a terminal SO for outputting the scan test signal DT. The terminal SO of one flip-flop circuit (for example, the flip-flop circuit 11A) is connected to the terminal DT of an adjacent flip-flop circuit (for example, the flip-flop circuit 11B), so that a scan test circuit can be formed by serially connecting the flip-flop circuits 11A through 11F to one another. A scan-in signal input from a scan test signal input terminal (that is, one of input pins) of the system LSI is received by the terminal DT of a flip-flop circuit disposed at the top of each scan test circuit within the system LSI, and a scan-out signal is output from the terminal SO of a flip-flop circuit at the last stage of the scan test circuit to the outside through a scan test signal output terminal (that is, one of output pins) of the system LSI. Part of the input/output pins of the system LSI provided for general use are also used as the scan test signal input terminal and the scan test signal output terminal. As the number of scan test circuits used for the scan test of the system LSI is increased, time required for the test is shorter, but the circuit area required for the scan test circuits is increased, and in addition, the number of elements affecting the operation timing or the like is disadvantageously increased. Accordingly, in consideration of this trade-off relationship, the number of scan test circuits, namely, the number of pins, appropriate to the circuit scale are determined in accordance with the number of test items and the circuit scale of the system LSI.

In testing the system LSI, the input pin of the system LSI serving as the scan test signal input terminal and the output pin thereof serving as the scan test signal output terminal are connected to a tester, so that the scan test signal DT output from the tester can be received at the scan test signal input terminal and that the data signal D having passed through the combinational circuit within the system LSI (a data value obtained by allowing the scan test signal to pass through the combinational circuit) can be sent to the tester. The tester compares the value of the data signal D with an expected value, so as to determine whether or not each element of the combinational circuit 10 is defective.

In the scan test, while the signal NT is in a shift mode, the scan test signal DT is successively sent to the flip-flop circuits 11A through 11F. Specifically, the scan test signal is successively sent from the terminal SO of a given flip-flop circuit to the terminal DT of the following flip-flop circuit every clock. When the shift operation is completed, all the flip-flop circuits hold the scan test signal to be input to the combinational circuit. This operation requires time corresponding to the number of clocks according to the number of pins of the system LSI. With the scan test signal DT thus held by the flip-flop circuits 11A through 11F, the signal NT is switched to enter a capture mode, in which each of the flip-flop circuits 11A through 11F fetches the data signal D. This capture operation can be carried out in time corresponding to one clock because the flip-flop circuits 11A through 11F simultaneously fetch the data signal. The data signal D is a signal having passed through the combinational circuit 10, and has an output value according to the value of the scan test signal DT having been input to the combinational circuit 10 from each flip-flop circuit 11.

Therefore, in the case where the expected value in accordance with the scan test signal DT input to the combinational circuit 10 does not accord with the value of the data signal D output from the combinational circuit 10, the combinational circuit 10 has some defect. In order to test the combinational circuit 10 with respect to desired test items, the operation for shifting the scan test signal and the operation for capturing the data having passed through the combinational circuit are repeatedly carried out. Thus, the scan test with respect to all the desired items is conducted.

The characteristic of the system LSI of this embodiment is as follows: As is shown in FIG. 1, the terminal SO for sending the scan test signal DT to the following flip-flop circuit 11 is provided separately from the terminal Q f or sending the data signal D or the scan test signal DT to the combinational circuit 10. During the shift mode of the scan test, the output of the terminal Q is fixed so as not to change the internal state of the combinational circuit 10 during the shift mode.

Figure 14B:
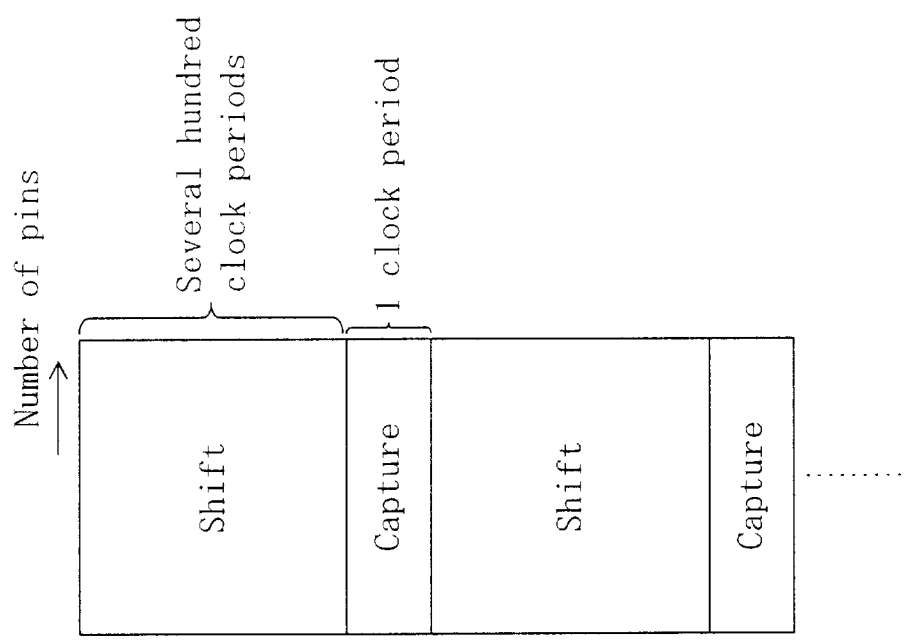
FIGS. 14(a) and 14(b) are respectively a diagram for showing part of a conventional system LSI including a scan test circuit and a change with time of control during a scan test.
Figure 14A:
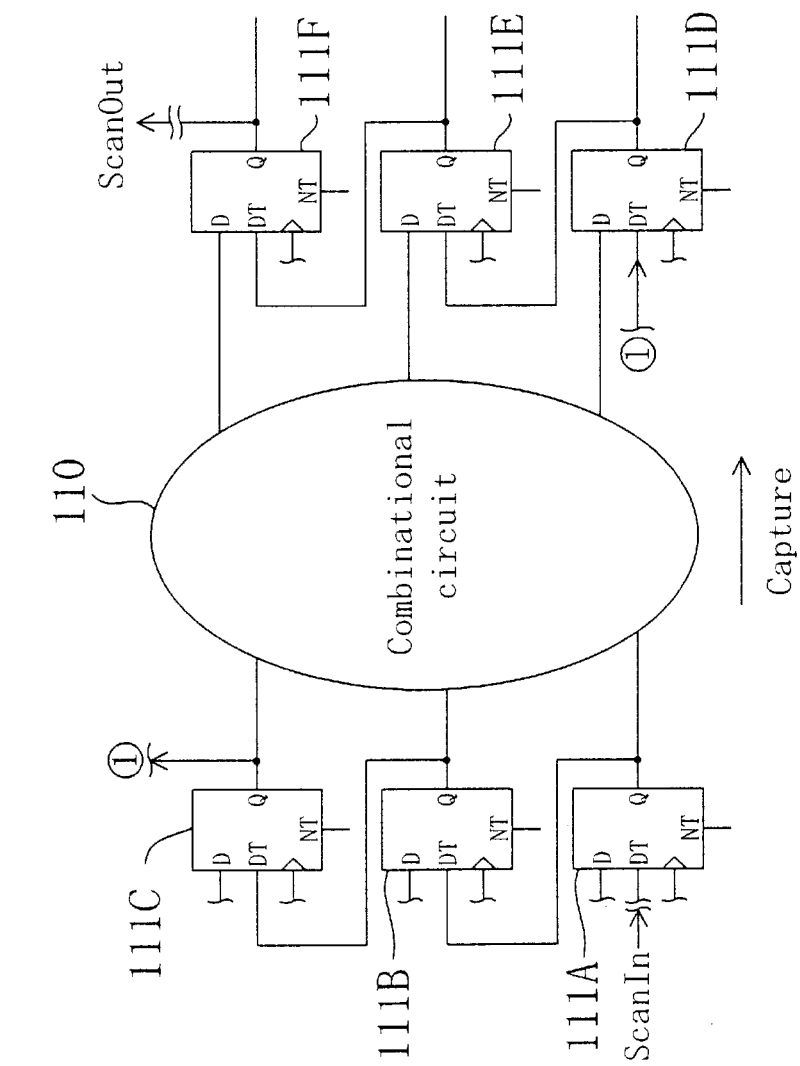
Figure 15:
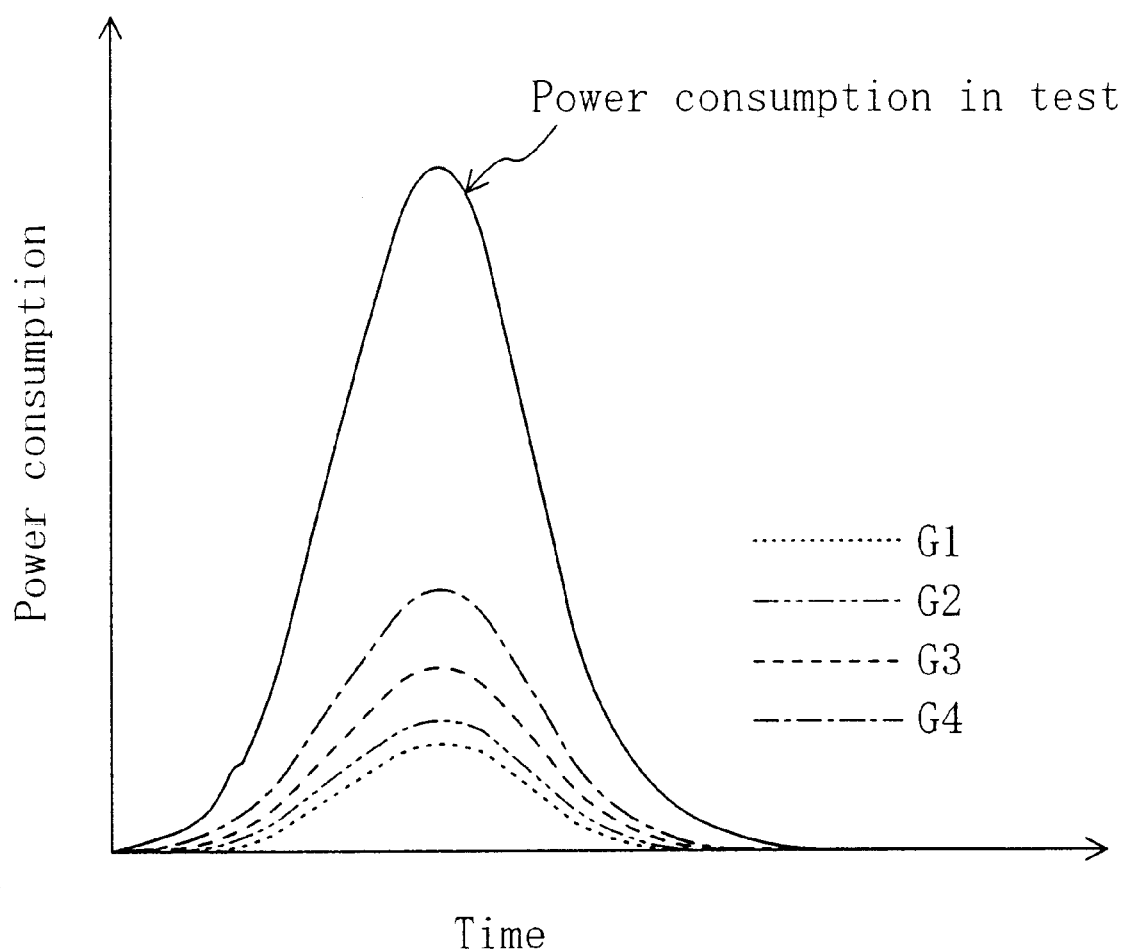
FIG. 15 is a diagram for exemplifying change with time of power consumption of an entire integrated circuit device during a conventional scan test.

Specifically, in the structure of the conventional scan test circuit shown in FIG. 14, the output of the terminal Q is changed due to the scan test signal successively sent to the flip-flops during the shift mode. In contrast, in the scan test circuit of this embodiment, the output of the terminal Q of the flip-flop circuit 11 is fixed during the shift mode, so as to suppress the increase of power consumption due to change of the internal state of the combinational circuit 10 every clock.

Now, specific examples of the circuit configuration of the flip-flop circuit for fixing the output of the terminal Q and specific examples of the operation in the scan test by using the exemplified flip-flop circuit will be described.

First Example of Configuration of Flip-flop Circuit

Figure 2:
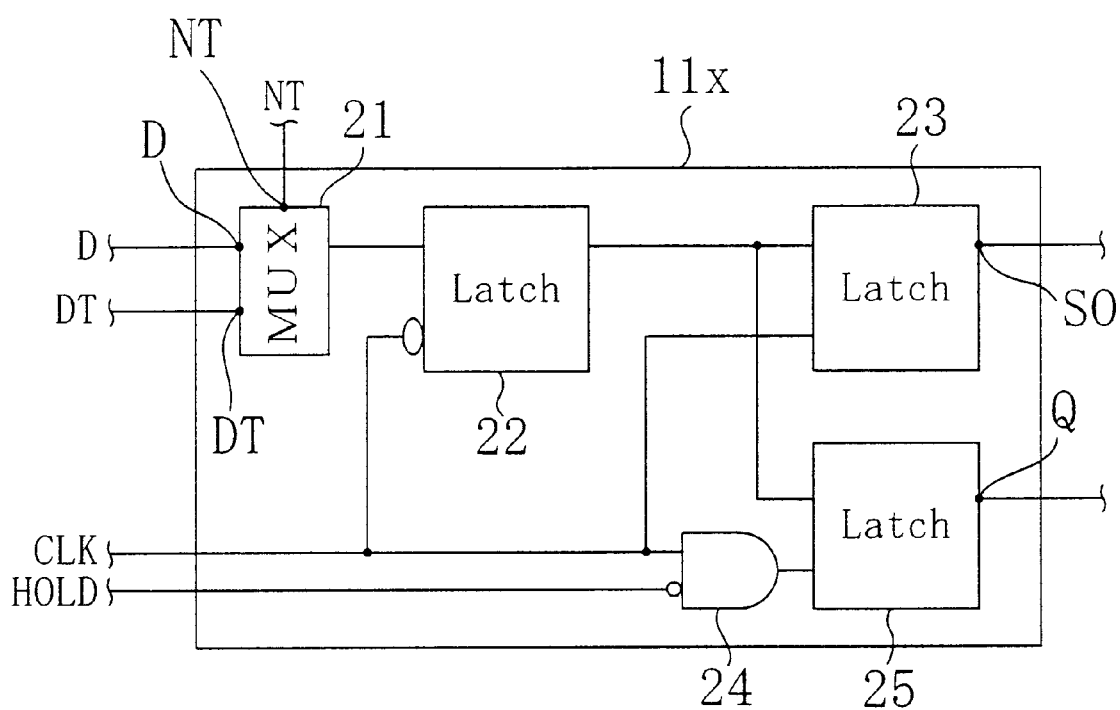
FIG. 2 is a circuit diagram for showing a first example of the configuration of a flip-flop circuit for fixing an output of a terminal Q.

FIG. 2 is a circuit diagram f or showing the configuration of a flip-flop circuit 11x described as a first example of the configuration for fixing the output of the terminal Q. As is shown in FIG. 2, the flip-flop circuit 11x includes a multiplexer 21 for receiving the data signal D and the scan test signal DT and functioning as a selector for selecting either signal in accordance with the signal NT; a first latch circuit 22 for latching the output of the multiplexer 21 in accordance with an inverted signal of a clock signal CLK; a second latch circuit 23 for latching the output of the first latch circuit 22 in accordance with the clock signal CLK; an AND circuit 24 for receiving the clock signal CLK and a hold signal HOLD and outputting the result of an AND operation of these signals; and a third latch circuit 25 for latching the output of the second latch circuit 23 in accordance with the output of the AND circuit 24. The two signal input ports of the multiplexer 21 respectively work as the terminals D and DT, the control signal input port of the multiplexer 21 works as the terminal NT, the output terminal of the second latch circuit 23 works as the terminal SO, and the output terminal of the third latch circuit 25 works as the terminal Q.

In this configuration, when the hold signal HOLD is "1", the output of the AND circuit 24 is always "0" no matter whether the clock signal CLK is "1 (H)" or "0 (L)". Accordingly, even though the output of the first latch circuit 22 is successively changed, the third latch circuit 25 whose output terminal works as the terminal Q keeps the same input value ("1" or "0") while the hold signal HOLD is "1". Specifically, during the shift mode, the scan test signal DT is output from the first latch circuit 22 in accordance with every pulse of the clock signal CLK, and passes through the second latch circuit 23 to be output to the following flip-flop circuit from the terminal SO. During this, the output of the third latch circuit 25, namely, the output of the terminal Q, is fixed to the value ("1" or "0") held when the hold signal HOLD is input to the AND circuit 24.

The signal NT can be used as a signal for fixing the output of the terminal Q instead of the hold signal HOLD. In other words, one terminal can be shared by the hold signal HOLD and the signal NT. In this case, an operation described in Embodiment 2 below can be conducted.

Second Example of Configuration of Flip-flop Circuit

Figure 3:
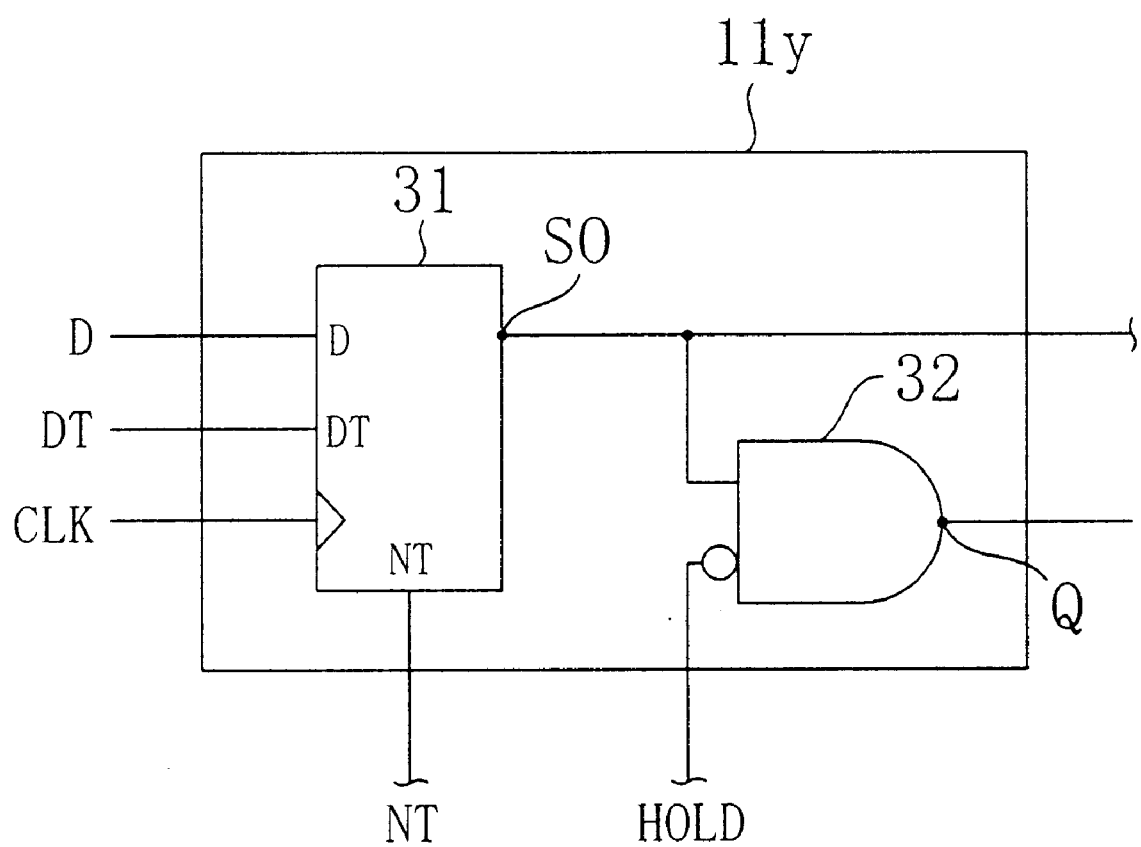
FIG. 3 is a circuit diagram for showing a second example of the configuration of the flip-flop circuit for fixing the output of the terminal Q.

FIG. 3 is a circuit diagram for showing the configuration of a flip-flop circuit 11y described as a second example of the configuration for fixing the output of the terminal Q. As is shown in FIG. 3, the flip-flop circuit 11y includes a flip-flop 31 having the same configuration as that of the conventional flip-flop shown in FIG. 14(a) except that the terminal Q of the conventional flip-flop works as the terminal SO; and an AND circuit 32 for receiving an inverted signal of the hold signal HOLD and the output of the flip-flop 31 and outputting the result of an AND operation of these signals. In the flip-flop circuit 11y of FIG. 3, the terminals D, DT, NT and the clock terminal of the flip-flop 31 respectively function as the terminals D, DT, NT and the clock terminal of the entire flip-flop circuit 11y, and the output terminal of the AND circuit 32 works as the terminal Q of the entire flip-flop circuit 11y.

In this configuration, while the hold signal HOLD is "1", the output of the AND circuit 32 is always "0" no matter whether the output of the flip-flop 31 is "1 (H)" or "0 (L)". Accordingly, even though the output from the terminal SO of the flip-flop 31 is successively changed, the output of the AND circuit 32 is kept to "0" while the hold signal HOLD is "1". Specifically, during the shift mode, the scan test signal DT is output from the terminal SO of the flip-flop 31 in accordance with every pulse of the clock signal CLK to be input to the following flip-flop circuit. During this, the output of the AND circuit 32, namely, the output of the terminal Q, is always fixed to "0".

Also in the configuration of FIG. 3, the signal NT can be used as a signal for fixing the output of the terminal Q instead of the hold signal HOLD. In other words, one terminal can be shared by the hold signal HOLD and the signal NT. In this case, the operation described in Embodiment 2 below can be conducted.

EMBODIMENT 2

In Embodiment 2, scan test methods performed by utilizing the configurations of the flip-flop circuit described as the specific examples in Embodiment 1 will be described.

First Example of Scan Test Method

Figure 4A:
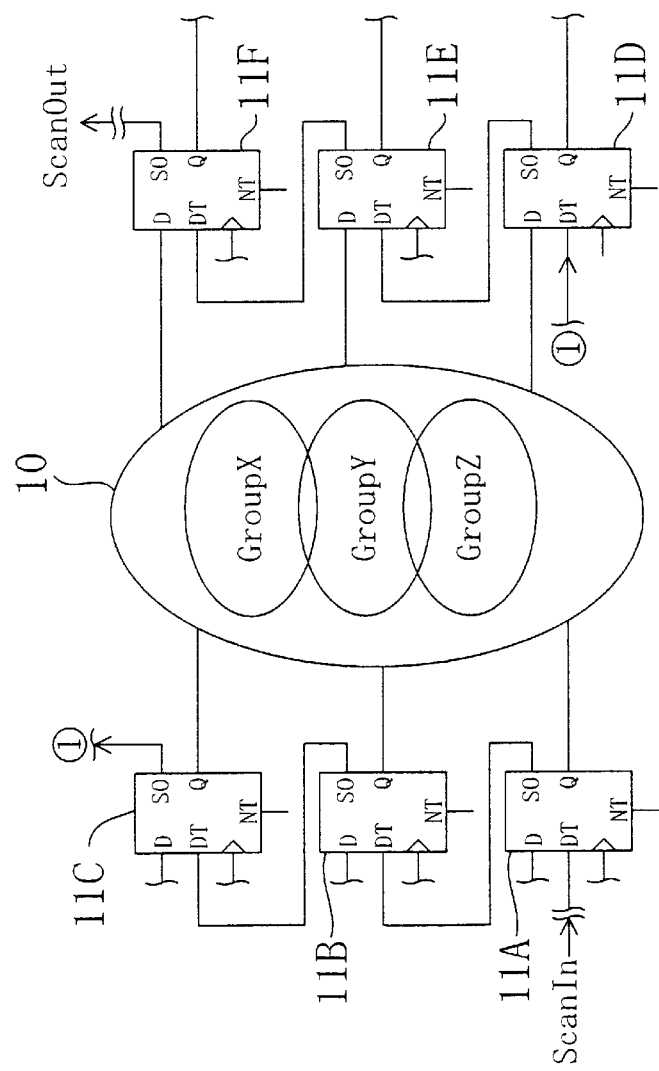
FIGS. 4(a) and 4(b) are respectively a circuit diagram for showing part of a system LSI used in a first example of a scan test method according to Embodiment 2 of the invention and a diagram for showing change of a test mode.
Figure 4B:
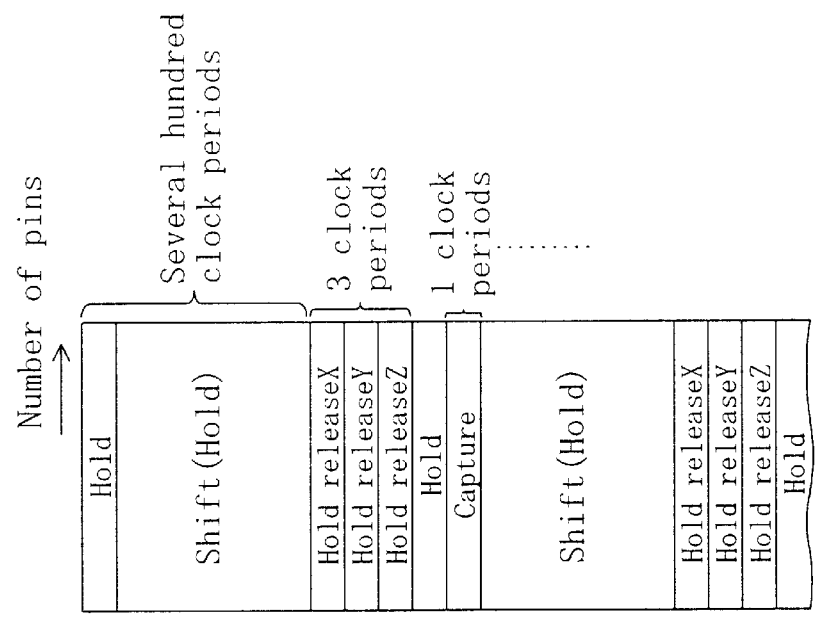

FIGS. 4(a) is a circuit diagram for showing part of a system LSI to be tested by a first example of the scan test method, and FIG. 4(b) is a diagram for showing change of the test mode. In this example, the flip-flop circuit 11x (shown in FIG. 2) described as the first example of Embodiment 1 is used.

First, as is shown in FIG. 4(a), elements of the combinational circuit 10 are divided into three groups X, Y and Z. Specifically, grouping is carried out as follows so that respective elements of the combinational circuit 10 affected by the input signals from the flip-flop circuits 11A through 11C can be substantially divided into three groups:

First a sum of ranges affected by the output from the terminal Q of each flip-flop circuit 11 is obtained. Then, all the elements of the combinational circuit 10 are divided into the groups X, Y and Z so that the sums of the affected ranges can be substantially uniform among the groups. It is noted that each of the groups X, Y and Z includes overlap elements. This is because a given element can be naturally affected by an output from the terminal Q of, for example, the flip-flop circuit 11A as well as another output from the terminal Q of the flip-flop circuit 11B. Although the number of flip-flop circuits 11A through 11C disposed at the front stage of one combination circuit 10 accidentally accords with the number of groups X, Y and Z within the combinational circuit 10 in this example, these numbers do not generally accord with each other. In general, a large number of flip-flop circuits are divided into several groups.

The grouping can be carried out by another method apart from that described above. For example, the elements of the combinational circuit 10 may be grouped so as to make the operation quantities of the respective groups substantially uniform.

Then, as is shown in FIG. 4(b), at the beginning of the scan test, the hold signal HOLD is set to "1" so as to fix the output of the terminal Q of the flip-flop circuit. During the shift mode, the hold signal HOLD is kept to "1" so as to hold and not change the internal state of the combinational circuit 10. Next, when the shift operation is completed, the operation does not immediately enter the capture mode but enters a mode for releasing the hold state kept by the hold signal HOLD. At this point, the fixed outputs of the terminals Q of all the flip-flop circuits are not simultaneously released but the fixed output is released successively with respect to each of the groups X, Y and Z of the flip-flop circuits (in this example, in the order of the flip-flop circuits 11C, 11B and 11A) so as to ultimately release the hold state in the respective groups X, Y and Z. The hold state releasing operation is carried out when a clock signal is at a high level. As a result, the third latch circuit 25 of FIG. 2 fetches the output of the first latch circuit 22 at that point, namely, the scan test signal DT. Then, in accordance with the hold signal HOLD, the outputs of the terminals Q of all the flip-flop circuits are fixed. Thereafter, the operation enters the capture mode, in which the data signal D is fetched by each flip-flop circuit 11 through the terminal D. At this point, since the internal state of the combinational circuit 10 is held by fixing the output of the terminal Q of each flip-flop circuit 11 before conducting the capture operation, the power consumption can be avoided from momentarily increasing due to simultaneous fetch of the data signals by all the flip-flop circuits 11A through 11F of the scan test circuit.

When the operation enters the shift mode, the data signal D is successively transferred to the subsequent flip-flop circuit in the scan test circuit, and a next scan test signal is successively sent to the scan test circuit. Then, when the data signals D once fetched by all the flip-flop circuits 11 within the scan test circuit of the system LSI are all sent to the tester and the next scan test signal DT is held by all the flip-flop circuits 11 of the scan test circuit (namely, when the shift operation is completed), the hold state is released again in the order of the groups X, Y and Z. Thus, the holding operation, the capture operation and the like are repeatedly conducted.

In the scan test method of this example, the internal state of the combinational circuit 10 is held before conducting the shift operation. Therefore, it is possible to suppress the increase of power consumption derived from simultaneous change of the respective elements of the combinational circuit caused every time the scan test signal DT sent to the flip-flop circuits 11A through 11F is shifted in the shift operation.

In addition, the elements of the combinational circuit 10 are divided into plural groups, the hold state is released in every group, and the capture operation is started after conducting the holding operation again. Therefore, the increase of the peak power consumption caused in conducting the hold releasing operation and the capture operation can be suppressed.

On the other hand, in the aforementioned scan test method, the hold releasing operation is required to carry out when a clock signal is at a high level. When the clock is slow, the hold state of all the three groups X, Y and Z may be released while one clock signal is at a high level, or the clock may be fixed to a high level for three clock periods during which the hold state can be released in all the groups. Furthermore, the holding operation can be carried out regardless of the clock signal. Accordingly, test time increased owing to the operations according to the scan test method of this example corresponds to four clock periods at most. In considering that the time required for the shift operation corresponds to several hundred clock periods, this increase in the test time is negligible.

Second Example of Scan Test Method FIG.

5(a) is a circuit diagram for showing part of a system LSI to be tested by a second example of the scan test method, and FIG. 5(b) is a diagram for showing change of the test mode. In this example, the flip-flop circuit 11x (shown in FIG. 2) described as the first example in Embodiment 1 is used.

First, as is shown in FIG. 5(a), elements of the combinational circuit 10 are divided into three groups X, Y and Z. This grouping is carried out in the same manner as described in the aforementioned first example of the scan test method, whereas the following restriction is placed: "a clock signal for conducting a capture operation of a flip-flop circuit (for example, the flip-flop circuit 11C disposed at the front stage) affecting a given group (for example, the group X) should not be input before a clock signal for conducting a capture operation of the flip-flop circuit 11F connected at the back stage of the group X". A specific grouping method will be described in detail below.

In the method of this example, as is shown in FIG. 5(b), after conducting the shift operation with the output of the terminal Q of the flip-flop circuit fixed, when the shift operation is completed, release of the fixed output of the terminal Q (namely, the hold releasing operation) and the capture operation are conducted with respect to each of the groups X, Y and Z of the flip-flop circuits (in this example, in the order of the flip-flop circuits 11C, 11B and 11A). At this point, for example, both the hold releasing operation and the capture operation may be conducted in the order of the groups X, Y and Z. Alternatively, after releasing the hold state in the order of the groups X, Y and Z, the capture operation for fetching the data signal D maybe conducted in the order of the groups X, Y and Z. Further alternatively, after releasing the hold state in the group X, the hold releasing operation in the group Y and the capture operation in the group X may be carried out at slightly shifted timing. Thus, the hold releasing operation and the capture operation can be carried out at any of various timing.

Thereafter, the holding operation is carried out again, and the operation enters the shift mode. The data signal D is successively transferred to the following flip-flop circuit in the scan test circuit, and a new scan test signal DT is successively sent to the scan test circuit. Then, the data signals D once fetched by all the flip-flop circuits 11 within the scan test circuit of the system LSI are all sent to the tester and the next scan test signal DT is held by all the flip-flop circuits 11 of the scan test circuit, and the hold releasing operation, the capture operation and the like are repeatedly conducted again in the order of the groups X, Y and Z.

In the scan test method of this example, the same effects as those of the first example can be attained. Also, as compared with the conventional scan test method, test time is increased by approximately 3 through 6 clock periods, which is negligible in consideration of the entire test time.

Third Example of Scan Test Method

Figure 6B:
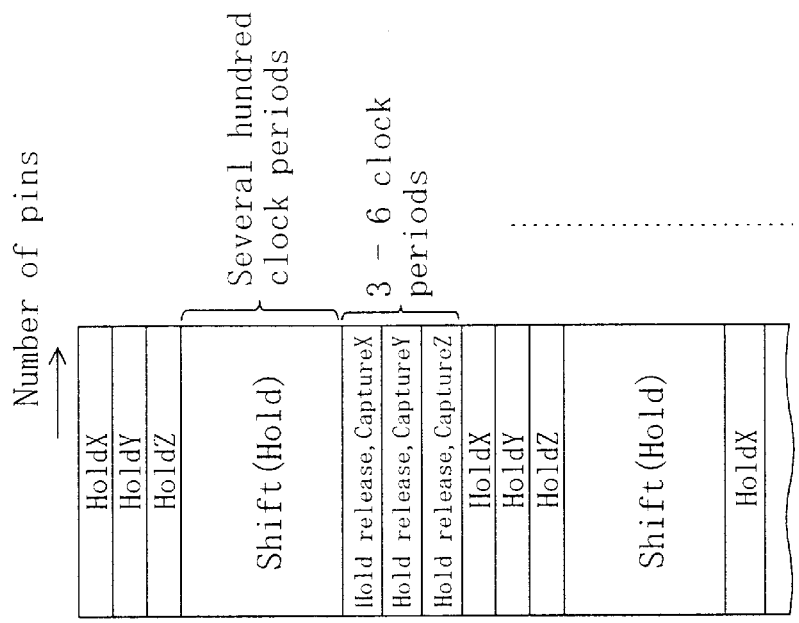
FIGS. 6(a) and 6(b) are respectively a circuit diagram for showing part of a system LSI used in a third example of the scan test method of Embodiment 2 and a diagram for showing change of a test mode.
Figure 6A:
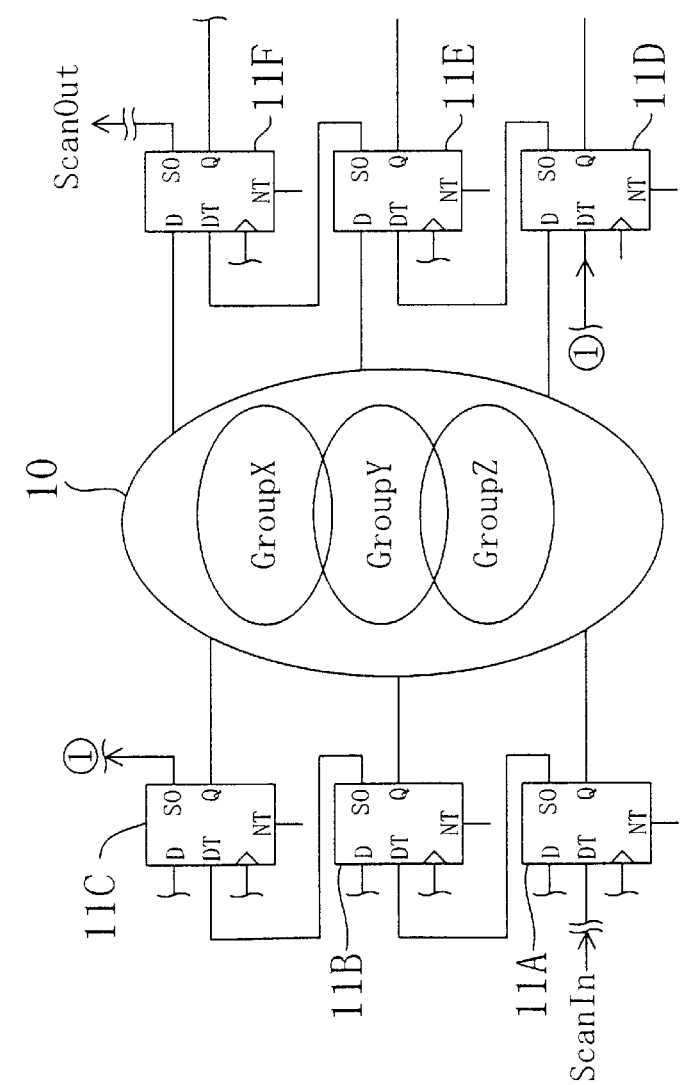

FIG. 6(a) is a circuit diagram for showing part of a system LSI to be tested by a third example of the scan test method, and FIG. 6(b) is a diagram for showing change of the test mode. In this example, the flip-flop circuit 11y (shown in FIG. 3) described as the second example in Embodiment 1 is used.

First, as is shown in FIG. 6(a), elements of the combinational circuit 10 are divided into three groups X, Y and Z. This grouping is carried out in the same manner as described in the aforementioned first example of the scan test method, whereas the following restriction is placed: "a clock signal for conducting a capture operation of a flip-flop circuit (for example, the flip-flop circuit 11C disposed at the front stage) affecting a given group (for example, the group X) should not be input before a clock signal for conducting a capture operation of the flip-flop circuit 11F connected at the back stage of the group X".

In general, the holding operation can be simultaneously conducted in all the groups in one clock period because it does not basically change the internal state of the combinational circuit 10. However, when the output of the terminal Q is fixed to "0" or "1", the fixing operation itself may cause great change in the combinational circuit 10, which may increase the peak power consumption to exceed the allowable power for the general use. Therefore, in the scan test method of this example, as is shown in FIG. 6(b), the outputs of the terminals Q of all the flip-flop circuits are not simultaneously fixed but at timing shifted among the respective groups X, Y and Z of the flip-flop circuits (in this example, in the order of the flip-flop circuits 11C, 11B and 11A). Thereafter, the operation enters the shift mode, and when the shift operation is completed, the hold releasing operation and the capture operation of the groups X, Y and Z are carried out in the same manner as described in the second example.

In the scan test method of this example, additional time is required due to the holding operation carried out dividedly in three clock periods as compared with the scan test method of the second example. However, in considering that the entire shift operation requires several hundred clock periods, this increase in the test time caused by dividedly conducting the holding operation is negligible. In addition, since the configuration of the flip-flop circuit 11y of the second example of Embodiment 1 (shown in FIG. 3) is employed, the circuit area required for the scan test circuit can be reduced as compared with those required in the first and second examples.

Share of Terminal by Hold Signal HOLD and Signal NT

As described above, one terminal can be used as both a terminal for the hold signal HOLD and a terminal for the signal NT in FIG. 2 or 3. In this case, the following operation can be carried out. It is assumed in the following description that the circuit configuration and the circuit operation with the combinational circuit grouped as described with reference to FIGS. 5(a) and 5(b) or 6(a) and 6(b) are employed.

First, when the signal NT is switched to enter the shift mode, the data signal D is fetched by each of the flip-flop circuits 11A through 11F. During this shift operation, the holding operation can be carried out in accordance with the signal NT.

After completing the shift operation, when the signal NT is freed from the shift mode, the hold state is simultaneously released. At this point, the hold releasing operation is carried out individually in the order of the groups X, Y and Z as is shown in FIG. 5(b) or 6(b) by successively freeing the signal NT in the flip-flop circuits 11C, 11B and 11A.

Also, the capture operation is carried out individually in the groups X, Y and Z. At this point, the data signal D is fetched by each of the flip-flop circuits 11A through 11F in accordance with the signal NT. Since the same terminal is used as the terminal for the hold signal HOLD and as the terminal NT, the signal NT has been freed from the shift mode and hence the hold state has been released.

For example, in using the flip-flop circuit 11x of FIG. 2, when the operation enters the shift mode, the signal NT is switched to enter the shift mode simultaneously in the flip-flops 11C, 11B and 11A as is shown in FIG. 5(b). Thus, the holding operation is simultaneously carried out in the groups X, Y and Z.

On the other hand, in using the flip-flop circuit 11y of FIG. 3, the signal NT is successively switched to enter the shift mode in the flip-flop circuits 11C, 11B and 11A as is shown in FIG. 6(b). Thus, the holding operation is carried out individually in the groups X, Y and Z.

Effect of Exemplified Test Method

Accordingly, in the scan test method of this embodiment, as described in the aforementioned examples, while holding the internal state of the combinational circuit 10, the operation for shifting the scan test signal is carried out. Furthermore, the respective elements of the combinational circuit 10 are grouped so that the hold releasing operation, the capture operation and the holding operation can be carried out in each group at shifted timing. As a result, the momentary increase of power consumption can be suppressed.

FIG. 7 is a diagram for showing the effect of the exemplified scan test method of this embodiment. As shown in FIG. 7, the elements of a combinational circuit are classified into groups G1 through G4, and the hold releasing operation, the capture operation and the holding operation are carried out in each group. Thus, the power consumption during the scan test can be dispersed. In this manner, the peak power consumption during the scan test of a system LSI can be definitely prevented from exceeding an allowable power consumption for general use of the system LSI.

EMBODIMENT 3

Embodiment 3 describes means for reducing power consumption in design of a system LSI, that is, an integrated circuit device.

Example of Grouping for Reducing Power Consumption

In a database used in the design of a combinational circuit and a scan test circuit, there are cores describing data necessary for designing the combinational circuit and the like. Accordingly, the combinational circuit and the like can be designed by utilizing the cores of the database. In each of these cores, however, data are generally looped in complicated relationships, and hence, it is difficult to accurately determine the order of cores to conduct a given operation.

In higher level design, however, each core includes a small number of elements, and hence, the order of the cores can be simply and rapidly obtained. In a general case, for example, at a functional level, there is merely data flow for indicating the flow of data among cores A, B and C as is shown in FIG. 8.

Figure 9:
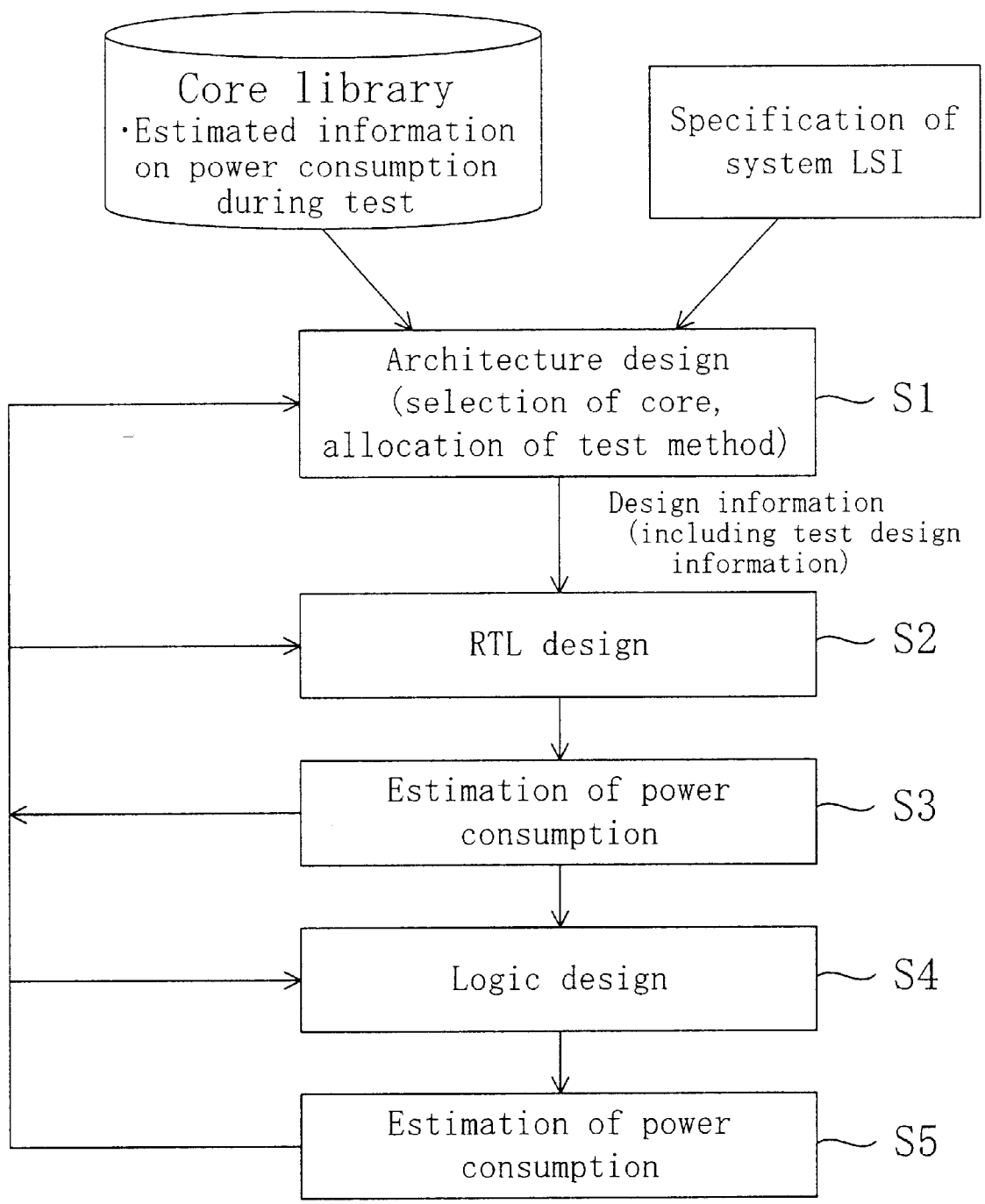
FIG. 9 is a flowchart for showing procedures in design in consideration of power consumption during a scan test according to Embodiment 3.

Therefore, it is effective to design a circuit in consideration of power consumption during a scan test through procedures as shown in FIG. 9.

First, in step S1, the description regarding a core library (such as power consumption and estimated information in a test) and the specification of a system LSI are input for architecture design. Specifically, it is determined which cores are to be used for design of an architecture for designing a desired system LSI.

The procedure of step S1 includes selection of cores and allocation of a test method. At this point, on the basis of, for example, the data flow information of cores as shown in FIG. 8, information that "a clock signal is input to the core C, and then successively to the cores B and A" is involved. Thus, grouping can be easily conducted in lower level design by utilizing this information. In other words, by selecting cores and allocating a test method in the higher level design where respective cores are dealt with in a mass, complicated procedures such as grouping in consideration of a specific massive circuit structure can be avoided.

Actually, when the grouping as described in Embodiment 1 is to be conducted, it is necessary to combine a control circuit, and in addition, it is also necessary to minutely determine, for example, how many clock systems are to be provided for inputting a clock signal in a desired order. In most cases, it is difficult to determine how the clock is to be provided or how a hold releasing operation is to be conducted at the stage of logic design. In particular, it is further difficult in a device like a system LSI including massive circuit elements.

Therefore, scheduling of the scan test is carried out so as to satisfy an allowable power value at the stage of the architecture design. Specifically, the number of groups for dividing a core, control of the entire chip during the test, test scheduling regarding cores to be simultaneously tested, instructions for design of a control circuit, and construction of the control circuit are determined at this stage.

Then, such design information including the test design information is passed to the lower level design, and then, RTL design is conducted in step S2 and power consumption is estimated in step S3. At the stage of the RTL design, the relationship in connection between respective elements through wires has not appeared yet but the relationship in logic operation between, for example, memory elements appears. Therefore, in step S3, the peak value of power consumption in the scan test as shown in FIG. 7 is obtained through simulation, so as to examine whether or not the design satisfies the specification such as the allowable power consumption value.

Then, logic design is conducted in step S4, where specific structures of respective circuits appear. Thereafter, the power consumption can be estimated through ultimate accurate simulation in step S5.

In this example, the strategy for attaining a test method for reducing power consumption is worked out in the higher level design (namely, in the architecture design). Therefore, the complication of procedures due to complicated loop relationships of data within the database can be avoided in the lower level design as well as the design for reducing power consumption can be rapidly conducted.

For example, if it is found to be impossible to satisfy the allowable power consumption value after the RTL design in step S2 and the estimation of the power consumption in step S3, it is necessary to conduct the architecture design over again. Alternatively, if a circuit structure for satisfying the allowable power consumption value cannot be found after the logic design in step S4 and the estimation of the power consumption in step S5, it is necessary to carry out the procedure of step S2 or S1 over again. In this manner, re-design loop is frequently repeated.

When the strategy of the test method for reducing power consumption is worked out in the higher level design as in this embodiment, however, basic items such as the number of groups for dividing cores and the scheduling of the test control are substantially appropriately designed. Accordingly, the repeat of the re-design loop can be effectively reduced.

Although the design method for reducing power consumption is described by exemplifying the scan test in this embodiment, the invention is not limited to the scan test. It goes without saying that the invention is applicable to another test method.

Furthermore, the estimated information of the power consumption during the test is not necessarily stored in the core library but-can be stored in any position of the database.

Example of Test Scheduling

Figure 10:
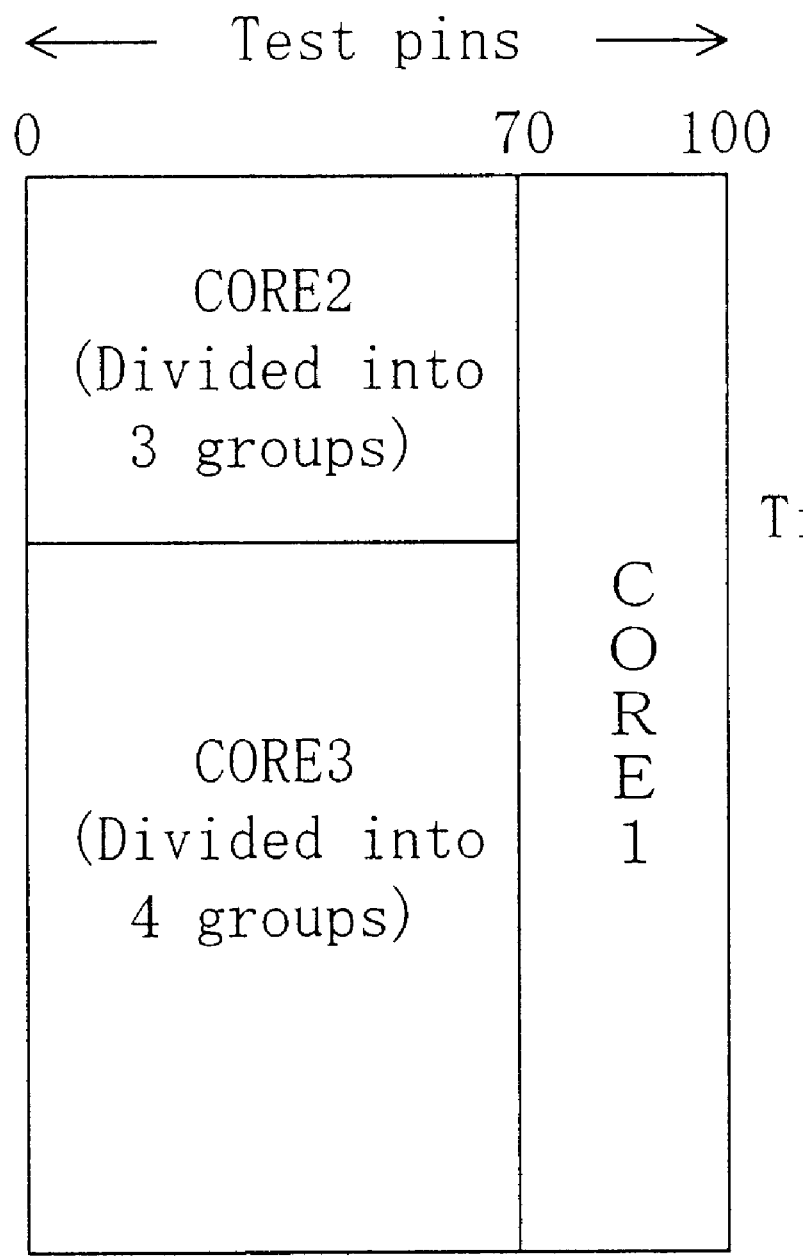
FIG. 10 is a diagram for showing an example of test scheduling accompanied by division of cores corresponding to a combinational circuit according to Embodiment 3.

FIG. 10 shows an example of the test scheduling accompanied by division of cores corresponding to a combinational circuit. As is shown in FIG. 10, when there are, for example, 100 test pins, the following test scheduling is worked out: In parallel with a test of cores 2 and 3 by using the 0th through 69th test pins, the 71st through 99th test pins are used for conducting a test of a core 1 by a test method different from that for the cores 2 and 3. In this case, the grouping has been conducted so as to divide the core 2 into three groups and the core 3 into four groups. Specifically, the scheduling is worked out for dispersing the capturing, holding, and hold releasing operations within one core and dispersing these operations among cores.

Owing to such test scheduling accompanied by the grouping, the lower level design can be smoothly carried out with the test time reduced and with the peak power consumption suppressed from exceeding the allowable value.

Examples of Elements of Core Library

Figure 11:
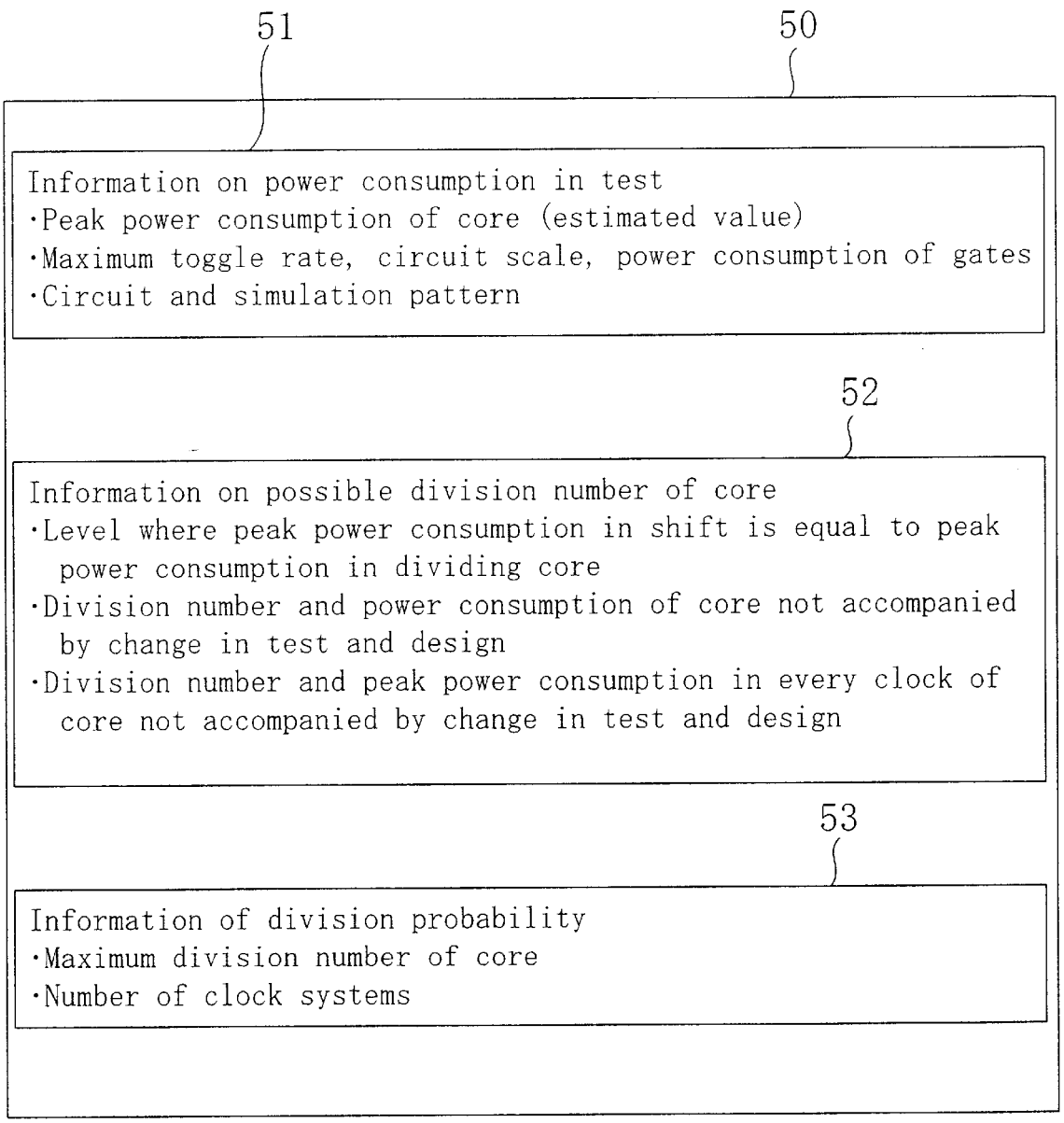
FIG. 11 is a diagram for showing examples of data described in a core library 50 of a database for use in design of a system LSI according to Embodiment 3.

FIG. 11 shows specific examples of the information described in a core library 50 in a database for use in the design of a system LSI. As is shown in FIG. 11, the core library 50 stores information 51 on power consumption during a test, information 52 on a possible number of groups for dividing a core, and information 53 on division probability of a core. In this manner, when the description regarding the peak power consumption during a test is thus included, it is possible to work out the strategy for the test so as to suppress the peak power consumption from exceeding the allowable value in the architecture design.

First, the information 51 on power consumption during a test includes description of peak power consumption of a core. This description corresponds to an estimated value of the peak power consumption of the core, and includes, if possible, an estimated value of peak power consumption during a shift operation, an estimated value of peak power consumption during a capture operation, an estimated value of peak power consumption during a holding operation, and an estimated value of peak power consumption in a hold releasing operation. As described above, each of the shift operation, the capture operation, the holding operation and the hold releasing operation can be controlled in a variety of patterns. Therefore, these patterns are all stored so as to be compared with one another, thereby selecting the most effective control pattern or the kind of flip-flop circuits to be used.

Furthermore, the information 51 on power consumption during a test of a core includes description regarding the maximum toggle rate of the core (transition probability of a signal), the circuit scale of the core (for example, the number of gates), and power consumption of gates included in the core. However, the description of power consumption of gates included in the core may not be stored in the library because in using a gate of, for example, 0.25 $\mu$m, power consumption of a gate of 0.25 $\mu$m is occasionally known as commonsense. In the case where accuracy in estimating the peak power consumption is not very high, the peak power consumption during the test can be comparatively precisely calculated on the basis of this description.

Moreover, the information 51 on power consumption during a test of a core includes description regarding a circuit and a simulation pattern. Owing to these description, the power consumption can be calculated through simulation of the test.

The information 52 on a possible number of groups for dividing a core includes, in addition to information (estimated value) of how many groups a core can be divided into, for example, description regarding a level at which the peak power consumption during a shift operation is equal to the peak power consumption during division of the core. Since the shift operation is carried out without dividing the core as described above, the peak power consumption in the shift operation cannot be reduced. Accordingly, too minute grouping is meaningless from the viewpoint of reduction of the peak power consumption. The division herein includes grouping of plural cores into several groups.

The information 52 on a possible number of groups for dividing a core includes description regarding the division number (the division number is already known or the core is already divided) and the peak power consumption of a core that has been determined in the layout, that is, so-called hard macro (for example, a multiplier), or a core not accompanied by change in the design of a test circuit (for example, a core with determined design to be reused or the like).

Furthermore, the information 52 on a possible number of groups for dividing a core includes description regarding the division number and the peak power consumption in each clock period of a core that is neither changed in the design nor subjected to a test, such as a core designated as a hard macro and a core designed by the aforementioned design method. In the case where a core that is already designed in accordance with the invention is reused or a core supplied from an IP vender or the like is used in addition to a core that is to be designed, namely, in the case where a core whose design has already been determined is to be combined in the system LSI, the information on the power consumption of such a core is utilized, so as to accurately grasp the peak power consumption of the entire system LSI during the test.

The information 53 on division probability includes description regarding the maximum possible division number of a core. The description can be an estimated value or an actual division number when the core is actually divided.

Furthermore, the information 53 on division probability includes description regarding the number of clock systems that can be constructed. The number of clock systems is one of the bases for determining the division number of a core. A circuit for controlling the order of clocks, such as a selector, cannot be easily modified. Therefore, when there are, for example, four clock systems, the information includes condition/restriction in the design that, in conducting given operations at shifted timing of clock, the timing can be shifted by up to four clocks. In addition, a limitation in control of, for example, "a capture operation conducted with respect to each group" can be obtained to be included in the information.

EMBODIMENT 4

Embodiment 4 describes a design method and a test method for a system LSI for conducting a test utilizing inverted clock including not only a scan test but also another test.

Figure 12:
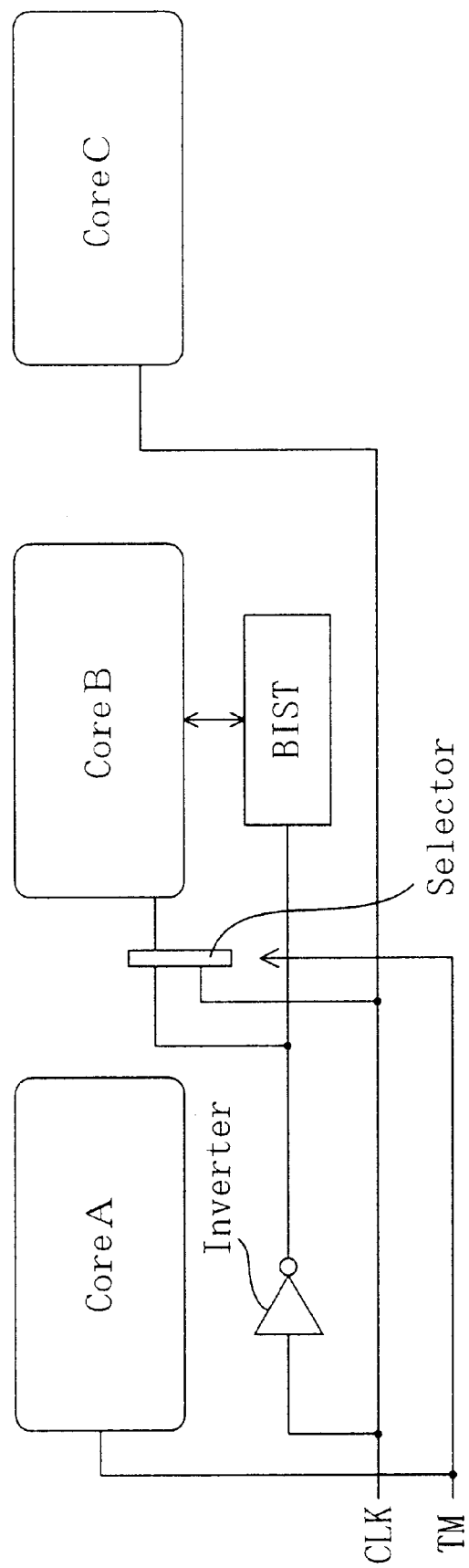
FIG. 12 is a diagram for explaining a test method utilizing inverted clock according to Embodiment 4 of the invention.
Figure 13:
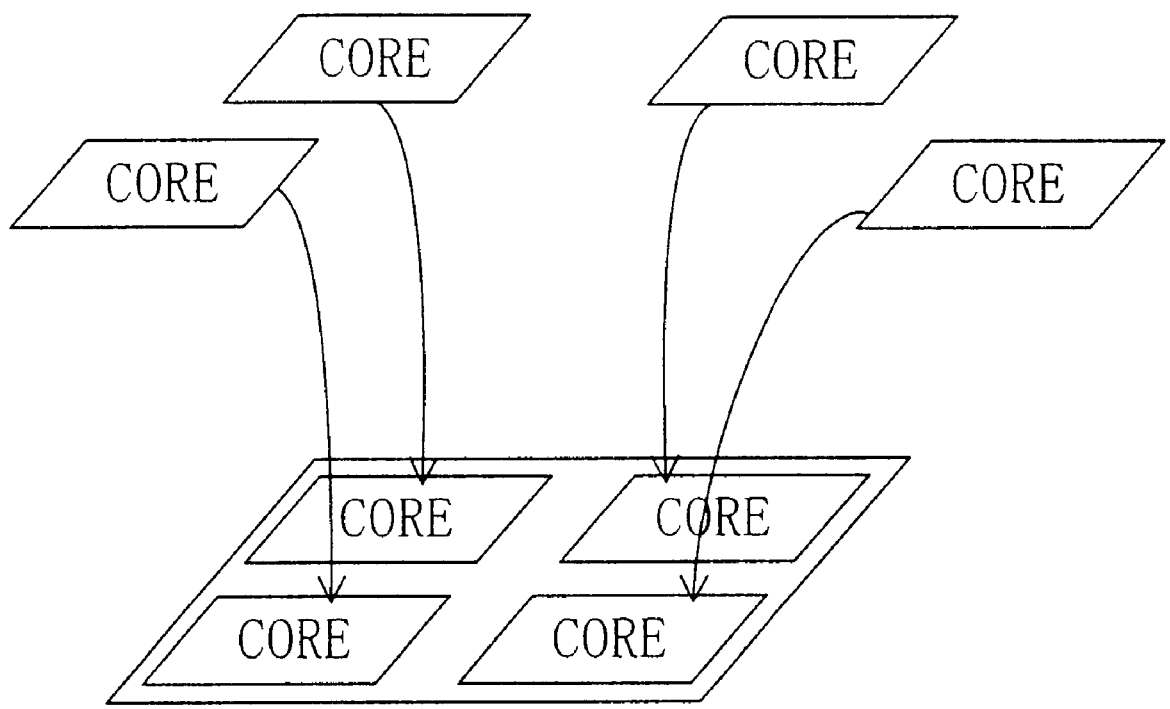
FIG. 13 is a perspective view of a state of designing an integrated circuit device in which data of circuits to be designed are taken out from a database.

FIG. 12 is a diagram for explaining a method of conducting a test utilizing inverted clock. For example, in the case where there is data f low of cores A, B and C, in which the cores A and C are assumed to be logic circuits and the core B is assumed to be a memory, the core B that is a memory is tested by a BIST or the like and the cores A and C that are logic circuits are subjected to, for example, the scan test described above. In the case where one system LSI thus includes circuits subjected to different kinds of tests, the following grouping is conducted in the design: As shown in FIG. 12, in a test mode where a test mode signal TM is at a high level, an inverted clock is input to the memory from a selector. Furthermore, the inverted clock is directly, not through the selector, input to the BIST for conducting the test. The test of the memory is carried out by using the inverted clock. Specifically, by using one clock system, the memory can be tested by the BIST while conducting the scan test on the core C. In this case, since the clock for controlling the test of the memory is inverted, timing of the peak power consumption during the test of the core C is shifted from timing of the peak power consumption during the test of the memory by a half clock period. Therefore, even when the core C and the memory are simultaneously tested, the peak power consumption does not become larger than the power consumed when they are individually tested.

In this manner, in conducting a test of a circuit other than a logic circuit in particular, the test time can be reduced without increasing the peak power consumption by utilizing inverted clock.

It goes without saying that the designed system LSI includes a logic circuit, a memory and a logic circuit instead of the cores A, B and C of FIG. 12, respectively.

Furthermore, the invention is applicable to the case where the cores A, B and C are the same kind of circuit, for example, are all logic circuits to be tested by the scan test. Also in this case, by using non-inverted clock and inverted clock as the clock in the scan test, the timing of the peak power consumption can be shifted between the cores.

Furthermore, the invention is applicable to the case using a clock scan type flip-flop or a LSSD type flip-flop, instead of the multiplexer type flip-flop in the embodiment.

What is claimed is:

1. An integrated circuit device comprising plural logic circuits and plural flip-flop circuits disposed between said plural logic circuits, wherein each of said flip-flop circuits includes:
a first input port for receiving a scan test signal;
a second input port connected to corresponding one of said logic circuits for receiving, as a data signal, an output of said logic circuit according to a scan test signal input to said logic circuit;
a third input port for receiving a control signal for switching input to said flip-flop circuit between said scan test signal and said data signal;
a fourth input port for receiving a hold signal;
a first output port connected to said logic circuit for transferring said scan test signal to said logic circuit; and
a second output port for outputting said data signal and said scan test signal,
a scan test circuit is formed by serially connecting said plural flip-flop circuits by successively connecting said second output port of an arbitrary flip-flop circuit among said plural flip-flop circuits to said first input port of another of said flip-flop circuits disposed at a next stage, and
an output value output from said first output port is fixed in receiving said hold signal at said fourth input port.

2. The integrated circuit device of claim 1,
wherein said output value output from said first output port of each of said flip-flop circuits is fixed to a value held in receiving said hold signal.

3. The integrated circuit device of claim 2,
wherein said fourth input port of each of said flip-flop circuits also works as said third input port.

4. The integrated circuit device of claim 1,
wherein said output value output from said first output port of each of said flip-flop circuits is fixed to 1 or 0 regardless of a value held in receiving said hold signal.

5. An integrated circuit device comprising:

first and second circuits;

a first test circuit for testing said first circuit;

a second test circuit for testing said second circuit;

a clock supply part for supplying a clock signal to said first circuit and said second circuit;

a clock inverting part for inverting the clock signal supplied from said clock supply part and outputting an inverted clock signal; and an output switching circuit disposed between said clock inverting part and said second circuit for receiving the clock signal and the inverted clock signal and outputting the inverted clock signal to said second circuit in testing said second circuit.

6. The integrated circuit device of claim 5, wherein said first circuit is a logic circuit, and said second circuit is a memory.

7. A method of testing an integrated circuit device, including plural logic circuits and plural flip-flop circuits disposed between said logic circuits, said flip-flop circuits being successively connected to form a scan test circuit, for conducting a scan test by repeating the steps of:

(a) conducting a holding operation for fixing an output signal from each of said flip-flop circuits to a path connected to corresponding one of said logic circuits;

(b) with said output signal from said flip-flop circuits fixed in the step (a), conducting a shift operation for successively sending a scan test signal to said flip-flop circuits and for successively sending a data signal from each of said flip-flop circuits to outside of said integrated circuit device;

(c) conducting a hold releasing operation for releasing said output signal fixed in the step (a) after completing said shift operation; and (d) conducting a capture operation for capturing an output signal of said logic circuit by each of said flip-flop circuits after the step (c).

8. The method of testing an integrated circuit device of claim 7, wherein elements of each of said logic circuits are divided into plural groups, said output signal is fixed to a value held by said flip-flop circuit in fixing said output signal in the step (a), the step (c) is conducted with respect to each of said groups, and after completing a first shift operation, the step (a) is carried out after the step (c) and before the step (d).

9. The method of testing an integrated circuit device of claim 7, wherein elements of each of said logic circuits are divided into plural groups, said output signal is fixed to a value held by said flip-flop circuit in fixing said output signal in the step (a), the step (c) and the step (d) are carried out with respect to each of said groups in a manner that a capture operation of one group is carried out after a hold releasing operation of said group, and after completing a first shift operation, the step (a) is carried out after the step (d).

10. The method of testing an integrated circuit device of claim 7, wherein elements of each of said logic circuits are divided into plural groups, said output signal is fixed to 1 or 0 regardless of a value held by said flip-flop circuit in fixing said output signal with respect to each of said groups in the step (a), the step (c) and the step (d) are carried out with respect to each of said groups in a manner that a capture operation of one group is carried out after a hold releasing operation of said group, and after a second shift operation, the step (a) is carried out after the step (d).

11. The method of testing an integrated circuit device of claim 7, wherein elements of each of said logic circuits are divided into groups in a manner that peak power consumption during the scan test does not exceed an allowable value of power consumption of said integrated circuit device in general use.

12. A method of testing an integrated circuit device including first and second circuits, a first test circuit for testing said first circuit, a second test circuit for testing said second circuit and a clock supply part for supplying a clock signal to said first and second circuits, wherein said first circuit is tested in accordance with the clock signal, and said second circuit is tested, while said first circuit is being tested, in accordance with an inverted clock signal obtained by inverting the clock signal.

13. The method of testing an integrated circuit device of claim 12, wherein said first circuit is a logic circuit, and said second circuit is a memory.

14. The integrated circuit device of claim 1, wherein said output value output from said first output port is fixed during a scan shift mode.

* * * * *

UNITED STATES PATENT AND TRADEMARK OFFICE
CERTIFICATE OF CORRECTION

PATENT NO. : 6,625,784 B1 Page 1 of 1
DATED : September 23, 2003
INVENTOR(S) : Mitsuyasu Ohta et al.

It is certified that error appears in the above-identified patent and that said Letters Patent is hereby corrected as shown below:

<u>Title page,</u>
Item [56], References Cited, U.S. PATENT DOCUMENTS", add:
-- 6,128,253 * 10/2000 Yamauchi, Hisashi .............................. 368/120 --

Signed and Sealed this

Twenty-seventh Day of January, 2004

JON W. DUDAS
*Acting Director of the United States Patent and Trademark Office*